June 23, 1942.  P. SOLINAS  2,287,500
SANITARY BEER COMB AND COCKTAIL MIXER RECEPTACLE
Filed Feb. 27, 1941
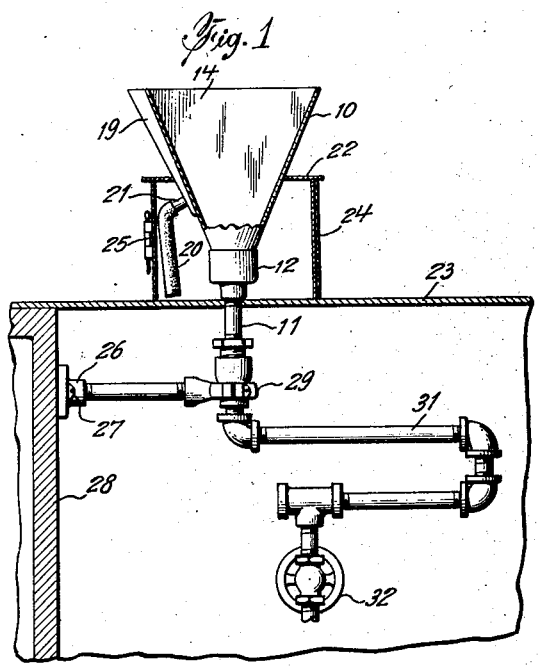
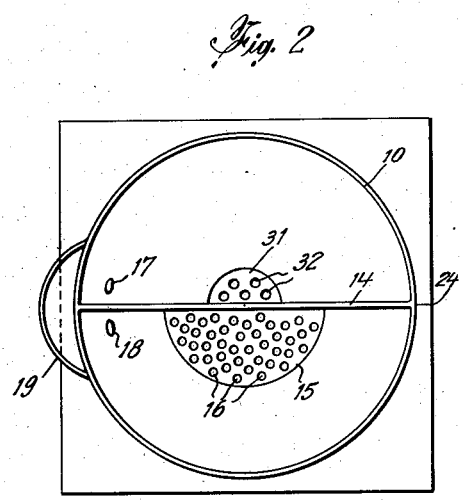
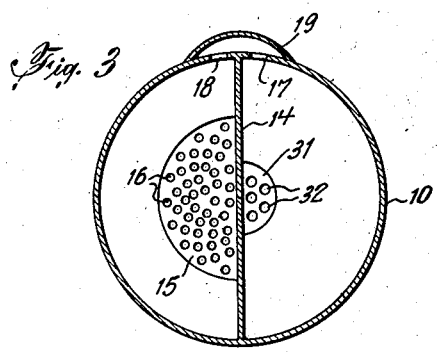
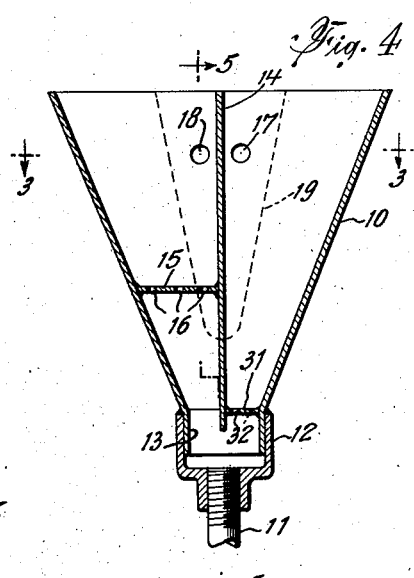
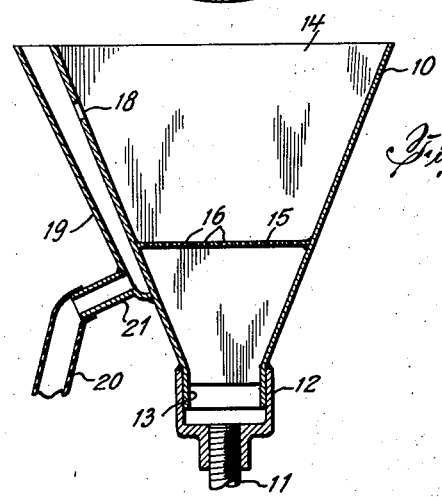
INVENTOR.
Peter Solinas
BY Benjamin Webster
ATTORNEY Patented June 23, 1942

2,287,500

UNITED STATES PATENT OFFICE 2,287,500

SANITARY BEER COMB AND COCKTAIL MIXER RECEPTACLE

Peter Solinas, Brooklyn, N. Y., assignor to Louis A. Coppola, Brooklyn, N. Y.

Application February 27, 1941, Serial No. 380,791

5 Claims. (Cl. 141—1)

My invention relates to receptacles for cleansing beer combs and cocktail mixers.

Heretofore in the art where beer has been served over a bar it has been customary for the bartender to use a beer comb to scoop off the excess top foam of a glass or stein of beer. The bartender by custom then places the beer comb in a glass of stationary water until he needs to use the beer comb again for another service. It is apparent that where a glass is used that the water is stationary and in a comparatively short time becomes stale and mixed with some of the beer leavings which have been introduced into the glass from time to time. It is obvious that very soon after the glass has first been used that the water will be so sour and distasteful that it will not properly clean the beer comb but will on the other hand leave the beer comb in such a condition that when the comb is next used to scoop out the top of a beer glass that the comb will leave stale drippings on top of the latest glass of beer to the distaste of a patron.

It is an object of my invention to provide a device whereby the beer comb may be conveniently held and entirely cleansed before each serving of a glass or stein of beer.

It is a further object of the invention to provide such a device in an accessible position and in which the beer combs may be easily placed.

It is a further object to provide a receptacle in which both beer combs and cocktail mixers may be placed and cleansed without contamination of the combs by the mixers, or vice versa.

It is a further object to provide such a device that is firm and durable, ornamental in appearance, and of low manufacturing cost.

It is a further object of the invention to provide means for preventing the removal of the device by a frolicsome customer.

Other objects will appear as the description proceeds.

Reference is made to the drawing, in which

Figure 1 is a vertical section showing the receptacle mounted at a tavern bar with a support fastened to a vertical wall under the bar.

Figure 2 is a top view of the receptacle and the housing therefor.

Figure 3 is a cross-section on the line 3—3 of Figure 4.

Figure 4 is a central vertical section at right angles to Figure 1.

Figure 5 is a vertical section on the line 5—5 of Figure 4.

A receptacle 10 has the form of an inverted cone flaring outwardly at the top and on all sides and terminating at the bottom in a cylindrical base 13 which connects with a vertical water-inlet pipe 11, the end of which is screw-threaded and mounts a connector 12 cupshaped at the top and having a cylindrical inner wall in which the receptacle base tightly fits and seals the connection against water leakage. A central vertical partition 14 may extend to the top of the receptacle and at the bottom within the base 13, thereby dividing the receptacle 10 into two equal compartments. The bottom of one compartment may have a floor 31 with perforations 32 therein opening directly into the base 13 and be adapted to receive beer combs; the other compartment may have a transverse floor 15 above the cylindrical base 13 adapted to support cocktail mixers and having therein perforations 16, serving as water inlets and smaller in diameter than that of the cocktail mixers. Near the top of the receptacle in the wall thereof are two outlets 17 and 18. It is now clear that a slow flow of water up thru the inlet pipe 11 divides equally in the two compartments of the receptacle 10, cleanses the beer combs in one compartment and the cocktail mixers in the other compartment without contact, and drains the wash water out of the outlets 17 and 18. A drain pipe 19 may be formed on the receptacle 10, covering the outlets 17 and 18, and the pipe 19 may have at the bottom an outwardly extending end 21, to which a rubber or other pipe 20 may be connected. The connection 12, the pipe 20, and the drain pipe end 21 may be covered with an ornamental and protective housing 22 which rests on top of the bar 23 thru an opening in which the pipe 11 projects upwardly. The housing 22 may be formed of two similar sections pivoted together at 24 and locked together at the opposite side at 25.

A support 26 may be secured by screws 27 to a vertical wall 28 and mount at the other end a clamp 29 which mounts water piping 31, connected with the outlet pipe 11, and into which the flow of water is controlled by a valve 32. The bar 23 adjacent the receptacle may be metal and have apertures for liquid drainage.

Having shown and described certain embodiments of my invention, but realizing that, in view of my disclosure many changes in material, form, size, omission of parts, additions of parts, or substitution of parts will readily occur to those skilled in the art, I do not limit myself to the exact disclosure.

I claim:

1. An automatic cleansing and hygienic holding device for beer combs and cocktail mixers comprising in combination, a support including a water inlet, a frusto conical receptacle having an aperture connected with said inlet and mounted on said support, said receptacle providing a bottom liquid-receiving region therein, a partition dividing said receptacle vertically and forming two separate compartments on opposite sides thereof, said partition extending upwardly from said bottom region which is thereby common to both compartments, each compartment having a bottom opening into said region and said region being open to the water inlet, a drain on the wall of the receptacle, and each compartment having an outlet in the upper part thereof into said drain.

2. An automatic cleansing and hygienic holding device for beer combs and cocktail mixers comprising in combination, a support including a water inlet, an upwardly flaring frusto-conical receptacle having an aperture connected with said inlet and mounted on said support, a partition dividing said receptacle from top to bottom to form two separate compartments, each compartment having a bottom opening into the water inlet, a drain on the wall of the receptacle, an outlet in the upper part of each compartment into said drain, and the bottom of one compartment higher than that of the other compartment and having apertures therein smaller in diameter than cocktail mixers to provide a support for the latter.

3. An automatic cleansing and hygienic holding device for beer combs and cocktail mixers comprising in combination, a support including a water inlet, an upwardly flaring frusto-conical receptacle having an aperture connected with said inlet and mounted on said support, a partition dividing said receptacle from top to bottom to form two separate compartments, each compartment having a bottom opening into the water inlet, a drain on the wall of the receptacle, an outlet on the upper part of each compartment into said drain, the bottom of one compartment being higher than that of the other compartment and having apertures therein smaller in diameter than cocktail mixers to provide a support for the latter, and a housing surrounding said support and the lower part of said receptacle tending to check the removal thereof.

4. An automatic cleansing and hygienic holding device for beer combs and cocktail mixers, comprising in combination, a support, a water inlet, an upwardly flaring frusto conical receptacle having an aperture connected with said inlet and mounted on said support, a partition dividing said receptacle centrally from top to bottom to provide two separate compartments, each said compartment having a bottom opening into said water inlet, a drain upon said flaring wall and leading downwardly on the outside thereof from the upper part of the receptacle, each said compartment being provided with an outlet adjacent the top whereby overflow of water will enter said drain, and the bottom of one compartment being higher than that of the other compartment and having apertures therein smaller in diameter than cocktail mixers to provide a support for said mixers.

5. An automatic cleansing and hygienic holding device of the character described, comprising in combination an upwardly flaring frusto-conical receptacle the entire bottom region whereof comprises a chamber of full cross-sectional area of the receptacle, a partition dividing said receptacle vertically and to the upper edge thereof and forming two separate compartments on opposite sides of the partition, said partition extending upwardly from said bottom region chamber which is thereby situated beneath both said compartments, each compartment having a perforate bottom wall between said compartment and chamber for receiving a share of water from said chamber, a supply pipe to said chamber, and each compartment having its own drain opening situated below the top of the receptacle and partition whereby intermingling of the water in the compartments is prevented.

PETER SOLINAS.